Oct. 9, 1923.

A. J. PAS 1,470,470

SCALE GUARD AND MARKER

Filed March 7, 1922

Witnesses:
Edwin Trueb

Inventor:
ARIE JAN PAS.
by D. Anthony Usina
his Attorney.

Patented Oct. 9, 1923.

1,470,470

UNITED STATES PATENT OFFICE.

ARIE JAN PAS, OF JEANNETTE, PENNSYLVANIA.

SCALE GUARD AND MARKER.

Application filed March 7, 1922. Serial No. 541,706.

*To all whom it may concern:*

Be it known that I, ARIE JAN PAS, a subject of the Queen of Holland, and resident of Jeannette, in the county of Westmoreland and State of Pennsylvania, have invented certain new and useful Improvements in Scale Guards and Markers, of which the following is a specification.

This invention relates to guard attachments for measuring scales and more particularly to a guard having a pointed marker thereon adapted to set off or mark measurements by perforating the work sheet.

The main objects of this invention are to provide a simple and inexpensive attachment for triangular scales, of standard design, which will serve the double purpose of scale guard to indicate quickly to a draftsman which one of the measuring edges of the scale is being used and to assist him in setting off measurements by perforating his paper at the limits of such measurements, and to provide a device of this character that will be cheap to manufacture, simple of construction and durable.

Figure 1:
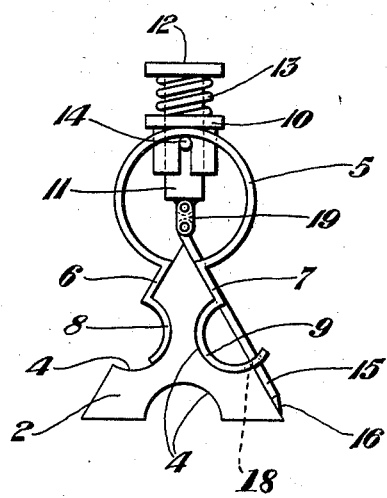

In the drawings, Figure 1 is an end elevation of the device applied to a scale of standard design.

Figure 2:
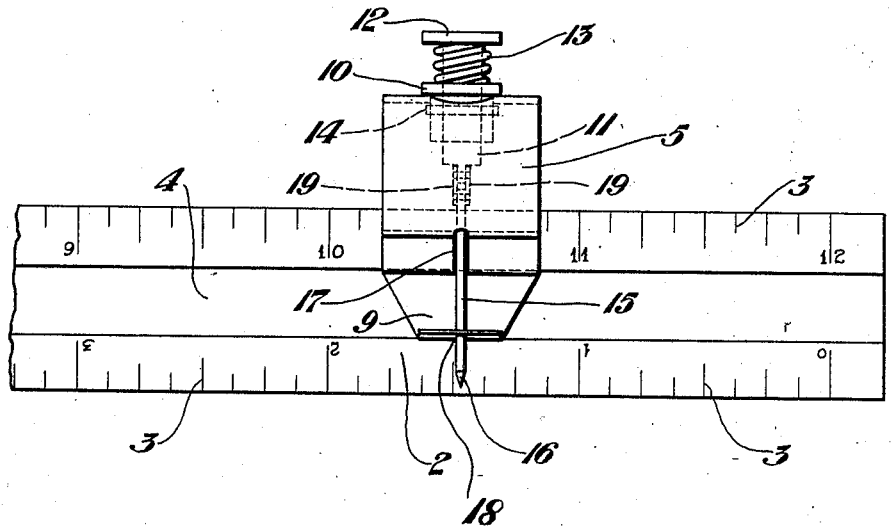

Figure 2 is a front elevation thereof.

Referring more particulaly to the drawings, the numeral 2 designates a triangular scale which is of ordinary or standard design. The scale 2 is adapted to rest on any one of its faces and is provided with graduations 3 on each face and along each edge. Each face of the scale has the usual longitudinal groove 4 extending along its middle line and the transverse section of the scale is uniform throughout.

The scale guard and marker has a scale engaging portion composed of a single piece of resilient sheet metal bent to form a substantially cylindrical or tubular top or body portion 5 and downwardly extending diverging legs 6 and 7. Each of the legs 6 and 7 is bent inwardly adjacent its lower end forming convex gripping faces 8 and 9, respectively, adapted to engage in the longitudinal grooves 4 of the scale 2.

The body portion 5 of the guard is apertured for the reception of a flanged sleeve member 10 and plunger 11 having a head 12 mounted for vertical reciprocatory movement in said sleeve. A coil spring 13 is mounted around the plunger 11 and has its ends bearing against the head 12 of the plunger and the flange of said sleeve, so as to normally hold the plunger in its raised or retracted position. The sleeve 10 is slotted vertically and a pin 14 is passed through the plunger 11 and is adapted to ride in said slots. The pin 14 serves to hold the plunger against the tension of the spring 13.

A marker 15 having a sharp pointed lower end 16 is mounted for reciprocatory movement in a guide slot 17 and aperture 18 in the leg 7 and parallels the one face of the scale. The upper end of the marker 15 extends through the body portion 5 and has its upper end operatively connected to the lower end of the plunger 11 by links 19.

In operation the scale 2 is held firmly against the work by one hand, and the guard is slid along the scale by grasping the body portion 5 with the other hand. When the marker point 16 has been alined with the desired graduation, it is driven into the paper by a downward pressure of the operator's finger on the top of the plunger 11. The marker will automatically retract when pressure is released from plunger 11 due to the tension of the spring 13. This guard also prevents accidental use of the wrong graduated edge of the scale, since the pointer will indicate the side of the scale in use.

I claim:—

1. As an article of manufacture, a scale guard comprising a strip of spring metal bent to form a substantially tubular body portion, a pair of diverging integral leg portions formed integral with and extending downwardly from said body portion, convex gripping faces formed on each of said legs, one of said legs being provided with an upturned lower end having an aperture therein and a slot above the gripping face of said leg and alined with said aperture, said slot and said aperture cooperating to form a guideway, a marker pin reciprocably mounted in said guideway, a vertical plunger mounted in the body portion of said guard, a link pivotally connected to the lower end of said plunger and the upper end of said marker pin, and a coil spring engaging said plunger and said body portion adapted to normally hold said plunger and marker in retracted position.

2. The combination with a graduated triangular scale having longitudinal grooves in at least two of its faces, of a scale guard comprising a piece of resilient sheet metal bent to fit over said scale and to resiliently and slidably engage in said grooves, a marker reciprocably mounted in said guard in a plane parallel with the inclined side face of said scale, a vertically disposed plunger mounted for reciprocation in said guard, a link pivotally connected to the lower end of said plunger and the upper end of said marker, and a spring member adapted to hold said plunger and marker in retracted position.

In testimony whereof, I have hereunto signed my name.

ARIE JAN PAS.